US012785534B2

(12) United States Patent
Qian et al.

(10) Patent No.: US 12,785,534 B2
(45) Date of Patent: Nov. 3, 2026

(54) CONTROL METHOD FOR FLYBACK CONVERTER IN CONTINUOUS CURRENT MODE

(71) Applicant: WUXI SI-POWER MICRO-ELECTRONICS CO., LTD., Wuxi (CN)

(72) Inventors: Hao Qian, Wuxi (CN); Wanru Jiang, Wuxi (CN); Renyue Ma, Wuxi (CN); Liang Yan, Wuxi (CN); Haodan Huang, Wuxi (CN)

(73) Assignee: WUXI SI-POWER MICRO-ELECTRONICS CO., LTD., Wuxi (CN)

( * ) Notice: Subject to any disclaimer, the term of this patent is extended or adjusted under 35 U.S.C. 154(b) by 0 days.

(21) Appl. No.: 19/127,735

(22) PCT Filed: Feb. 21, 2025

(86) PCT No.: PCT/CN2025/078496
§ 371 (c)(1),
(2) Date: May 6, 2025

(87) PCT Pub. No.: WO2025/251689
PCT Pub. Date: Dec. 11, 2025

(65) Prior Publication Data

US 2026/0012075 A1 Jan. 8, 2026

(30) Foreign Application Priority Data

Jun. 4, 2024 (CN) ........................ 202410712511.X

(51) Int. Cl.
*H02M 1/00* (2007.01)
*H02M 3/335* (2006.01)

(52) U.S. Cl.
CPC ..... *H02M 1/0003* (2021.05); *H02M 3/33576* (2013.01); *H02M 1/0038* (2021.05)

(58) Field of Classification Search
CPC ........... H02M 1/0003; H02M 3/33576; H02M 1/0038; H02M 1/0009; H02M 1/0025;
(Continued)

(56) References Cited

U.S. PATENT DOCUMENTS 8,995,150 B2 * 3/2015 Yan .................. H02M 3/33507 363/21.16
11,223,283 B2 * 1/2022 Zheng .............. H02M 3/33515
(Continued)

FOREIGN PATENT DOCUMENTS

| | | | |
|---|---|---|---|
| CN | 107154723 | A | 9/2017 |
| CN | 111884522 | A | 11/2020 |
| CN | 114696626 | A | 7/2022 |

*Primary Examiner* — Thienvu V Tran
*Assistant Examiner* — Lauren Ashley Shaw
(74) *Attorney, Agent, or Firm* — Yue (Robert) Xu; Apex Attorneys at Law, LLP

(57) ABSTRACT

Disclosed is a control method for a flyback converter in continuous current mode (CCM). When the flyback is operated in critical current mode, a current peak value is recorded as $i_{pk1}$ and corresponding turn-off time as $T_{off1}$, which is recorded as a first period; if a current peak value $i_{pk}$ of a certain period is not higher than $i_{pk1}$, the switch is turned on after its original logic, which is recorded as a second period; if $i_{pk}$ is higher than $i_{pk1}$ with difference $\Delta i$, the turn-off time is controlled to $T_{off1}-k\cdot\Delta i$, thereby preventing the current from returning to zero at the end, such that entering CCM, which is recorded as a third period; and then, the flyback is switched between DCM and CCM based on $i_{pk}$. The present invention can stably control and regulate a duty cycle of the flyback entering CCM, and the calculation of the average output current.

6 Claims, 5 Drawing Sheets

(58) Field of Classification Search
CPC ........... H02M 1/0035; H02M 3/33507; H02M 7/217; Y02B 70/10
See application file for complete search history.

(56) References Cited

U.S. PATENT DOCUMENTS

| | | | | |
|---|---|---|---|---|
| 2010/0321956 | A1* | 12/2010 | Yeh .................. | H02M 3/33507 363/16 |
| 2018/0083541 | A1 | 3/2018 | Liang et al. | |
| 2021/0257920 | A1 | 8/2021 | Cheng et al. | |

* cited by examiner

CONTROL METHOD FOR FLYBACK CONVERTER IN CONTINUOUS CURRENT MODE

This application is the national phase of International Application No. PCT/CN2025/078496, titled "CONTROL METHOD FOR FLYBACK CONVERTER IN CONTINUOUS CURRENT MODE", filed on Feb. 21, 2025, which claims priority to the Application No. CN202410712511.X filed with the CNIPA on Jun. 4, 2024, the entire disclosures of which are incorporated herein by reference.

TECHNICAL FIELD

The present invention relates to the technical field of controlling a chip of switching power supply, in particular to a control method for a flyback converter in a continuous current mode.

BACKGROUND OF THE INVENTION

Switching power supplies are a source of energy for most electrical and electronic products, with alternating current to direct current conversion (AC/DC) being the first step in obtaining energy from the grid. Generally, an AC/DC converter consists of a rectifier bridge and direct current to direct current conversion (DC/DC). As shown in FIG. 5, alternating positive and negative sinusoidal voltage has to pass through the rectifier bridge to be converted into a positive full-wave voltage, and then a filter capacitor to form a more stable voltage for a next-stage DC/DC converter. However, the voltage of the grid serves as an input voltage, which has a wide range of 80-280 Vac depending on the countries and locations, while the frequency of the grid will greatly fluctuate along with the load: 47-63 Hz. Both restrict the use of the filter capacitor, which needs to withstand the highest input voltage and have a large enough capacitance to ensure the normal operation and performance of the next-stage DC/DC. Using a filter capacitor with small capacitance will make the voltage on the filter capacitor fluctuate greatly and the minimum voltage lower.

Flyback converter, as a main topology of small and medium power AC/DC switching power supplies, has been widely used in various types of consumer electronic products. Chargers, with the popularization of smart phones, have set more stringent requirements on power density of the whole power supplies and the volume of each component. The filter capacitor after the rectifier bridge usually needs to use the electrolytic capacitor with nominal voltage of 400 V, and its capacitance needs to reach more than 2 μF/W of the full-load power. The volume of the filter capacitor accounts for 30-40% of the entire charger, making it become the most difficult component to reduce its volume.

FIG. 6 shows a typical AC/DC flyback converter application circuit, where the input is an AC voltage, BD is a rectifier bridge, C1 is a filter capacitor, Vbus is the voltage on C1, Q1 is a main switch on a primary side, Q2 is a rectifier switch on a secondary side, and a transformer T has one primary winding with turns $N_p$, and one secondary winding with turns $N_s$. C2 is an output filter capacitor, RL is an output load, and $V_o$ is a DC output voltage. When the flyback converter operates at a continuous current mode (CCM), Q1 operates with a certain pulse period of a duty cycle D, and $V_o$/Vbus satisfies Ns/Np·D/(1−D). When the use of a smaller C1 capacitance causes a larger variation in Vbus voltage, the flyback converter needs to be able to respond to a larger duty cycle and a higher peak current in time to satisfy a condition that the output voltage does not drop.

An existing peak current control technique can control the flyback converter well under the closed loop. The basic block diagram thereof is shown in FIG. 7, a control circuit samples a current flowing through a switch Q1, and compares it with the current peak value calculated by loop through a comparator 1. When the current exceeds the peak value, the comparator is flipped to turn off Q1, and then an oscillator generates a changing periodic pulse signal, or combines with a resonance valley signal obtained from the detection of an auxiliary winding $N_a$ so as to turn on Q1. The technique is simple to implement, which can not only ensure that the current flowing through the transformer and Q1 is within the safety range, but also can realize the decoupling of the inductive current in the loop control, thus improving the loop stability. However, the disadvantage is that when the duty cycle D of the CCM is greater than 50%, subharmonic oscillation is generated, and it is necessary to add a fixed slope compensation to the loop. On the one hand, the original peak current is lowered, and the amount of compensation is sometimes insufficient or overshoot. On the other hand, the duty cycle is limited to be within 80% because of the fixed oscillator frequency, and thus the output voltage cannot be maintained stable at a lower Vbus voltage.

Secondly, the existing peak current control technique also takes into account the calculation of an average output current to ensure the consistency of overcurrent points under a wide range of input and output conditions, i.e., a primary constant-current control without optocoupler feedback, as shown in FIG. 8, periodic averaging of the current of the transformer at the current descending phase is required to obtain the average output current. The calculation under a discontinuous current mode (DCM) requires the use of the auxiliary winding in FIG. 7 to detect current demagnetization time of the transformer, and then use of the triangle area formula. The calculation under the CCM needs to analyze a complete transformer current signal, such as detecting a start value or a midpoint value of the current trapezoid. The disadvantage of this calculation method is that the complete transformer current signal is prone to being affected by turn-on noise and sampling delay. If there is no relevant compensation, the calculation error of the final average output current under the CCM is larger than 10%.

Based on the above considerations, there is a need for a control method that can further reduce the C1 filter capacitor and also takes into account the calculation of the average output current of the DCM and the CCM.

SUMMARY OF THE INVENTION

An objective of the present invention is to provide a method of controlling a flyback converter in a continuous current mode (CCM), which enables a stable control and regulation on the depth and speed of the flyback entering CCM, and also considers the calculation of the average output current, and achieves that the flyback converter can use an input filter capacitor with a smaller capacitance after the application of AC/DC rectifier bridge, and reduces output voltage ripples, which ultimately achieves a higher power density.

The objective of the present invention can achieve a control method for a flyback converter in a CCM by means of the following technical solutions. The control method includes:

step 1: based on a peak current control technique, recording a current peak value of a transformer as $i_{pk1}$ and corresponding turn-off time $T_{off1}$, which is recorded as a first period, when the flyback converter is operated in a critical current mode;

step 2: if a current peak value $i_{pk}$ of a certain period is not higher than $i_{pk1}$, turning on the switch after its original turn-off logic ends, which is recorded as a second period;

step 3: if a current peak value $i_{pk}$ of a certain period is higher than $i_{pk1}$ with a peak value difference $\Delta i$, controlling the switch to reduce the turn-off time of the period to be $T_{off1}-k\cdot\Delta i$, thereby preventing the current from returning to zero at the end of the period, such that the switch enters the CCM, which is recorded as a third period, where k is a preset proportionality coefficient; and step 4, switching the flyback converter between discontinuous current mode (DCM) and the CCM based on the current peak value $i_{pk}$.

As a further solution of the present invention, in step 1, the operating mode of a certain period is configured to be changed, by setting the current peak value of the period as $i_{pk1}$ and turning on in the critical current mode, thereby obtaining the turn-off time $T_{off1}$.

As a further solution of the present invention, in step 1, the critical current mode is not limited to turning on the switch immediately after the current of the transformer returns to zero, but may include turning on the switch at the first valley of resonance, wherein the difference between the two time points is half of the system resonance period.

As a further solution of the present invention, in step 3, when a minimum input voltage of the flyback converter decreases, the CCM duty cycle and the k value are configured to increase, generating a substantial shorter turn-off time of the third period.

As a further solution of the present invention, a calculation method for an average output current is as follows:

$$I_o = \frac{1}{2}\left[i_{pk} + \Delta i \times \left(1 + \frac{N_{ps} \times V_o}{L_m} \times k\right)\right] \times N_{ps} \times \frac{T_{off}}{T_s}$$

where $i_{pk}$ is a current peak value of each period, $\Delta i$ is $i_{pk}-i_{pk1}$ (positive number or zero), $N_{ps}$ is a transformer primary-to-secondary turn ratio, $V_o$ is a flyback output voltage value, $L_m$ is a transformer excitation inductance, $T_{off}$ is turn-off time or transformer current demagnetization time, and $T_s$ is period time.

As a further solution of the present invention, in the first period and the second period, the current peak value $i_{pk}$ is less than $i_{pk1}$, and $\Delta i$ is configured to be substituted as a zero value in the calculation method for the average output current, which is simplified as:

$$I_o = \frac{1}{2} i_{pk} \times N_{ps} \times \frac{T_{off}}{T_s}$$

As a further solution of the present invention, when an average output current is calculated, in the first period and the second period, $T_{off}$ is transformer current demagnetization time, and in the third period, since the current of the transformer cannot return to zero at the end of the period, $T_{off}$ is $T_{off1}-k\cdot\Delta i$.

The present invention has the following beneficial effects: by controlling the turn-off time of the flyback converter, the depth and speed of entering the CCM can be stably controlled and regulated, and the calculation of the average output current is also taken into account, thereby achieving that the flyback converter can use an input filter capacitor with a smaller capacitance after the application of AC/DC rectifier bridge, reducing output voltage ripples, and ultimately achieving a higher power density.

BRIEF DESCRIPTION OF DRAWINGS

The present invention is further described below in conjunction with the accompanying drawings.

DETAILED DESCRIPTION OF THE INVENTION

It should be noted that embodiments and features in the embodiments of the present invention may be combined with each other as long as there is no conflict. The present invention will be described in detail below with reference to the accompanying drawings and in conjunction with the embodiments.

In order to make those skilled in the art better understand the solutions of the present invention, the technical solutions in the embodiments of the present invention will be clearly and completely described below in conjunction with the accompanying drawings in the embodiments of the present invention. Evidently, the described embodiments are only part of the embodiments of the present invention, rather than all the embodiments. Based on the embodiments of the present invention, all other embodiments obtained by a person of ordinary skill in the art without making creative work shall fall within the scope of protection of the present invention.

It should be noted that terms "first", "second", etc., in the specification and claims of the present invention and the accompanying drawings mentioned above are used to distinguish between similar objects and need not be used to describe a particular order or sequence. It should be understood that the terms so used may be interchangeable when appropriate, so as to facilitate the description he embodiments of the present invention. In addition, the terms "including" and "having", and any variations thereof, are intended to cover non-exclusive inclusion, e.g., a process, method, system, product or device including a series of steps or units needs not be limited to those steps or units as clearly listed, but may include those steps or units that are not clearly listed or that are inherent to the process, method, product or device.

Figure 2:
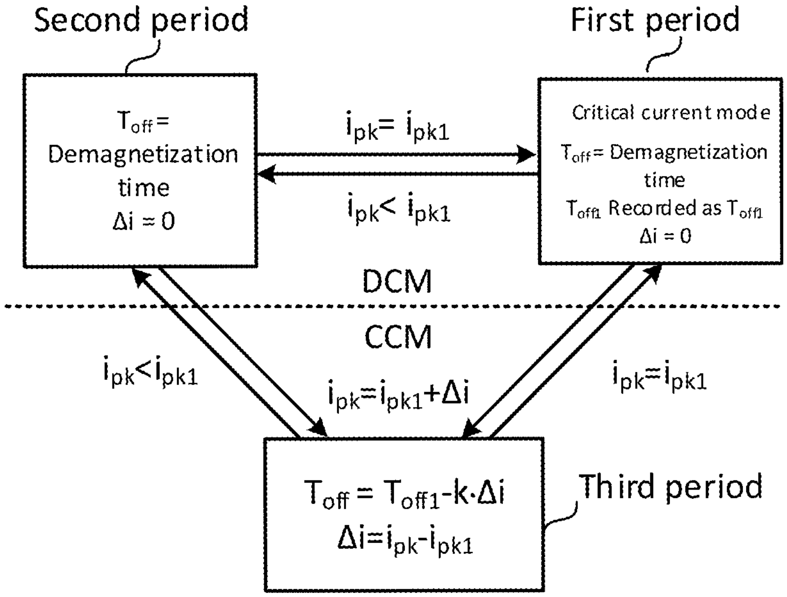
FIG. 2 is a flowchart of the control method implemented by the present application.
Figure 3:
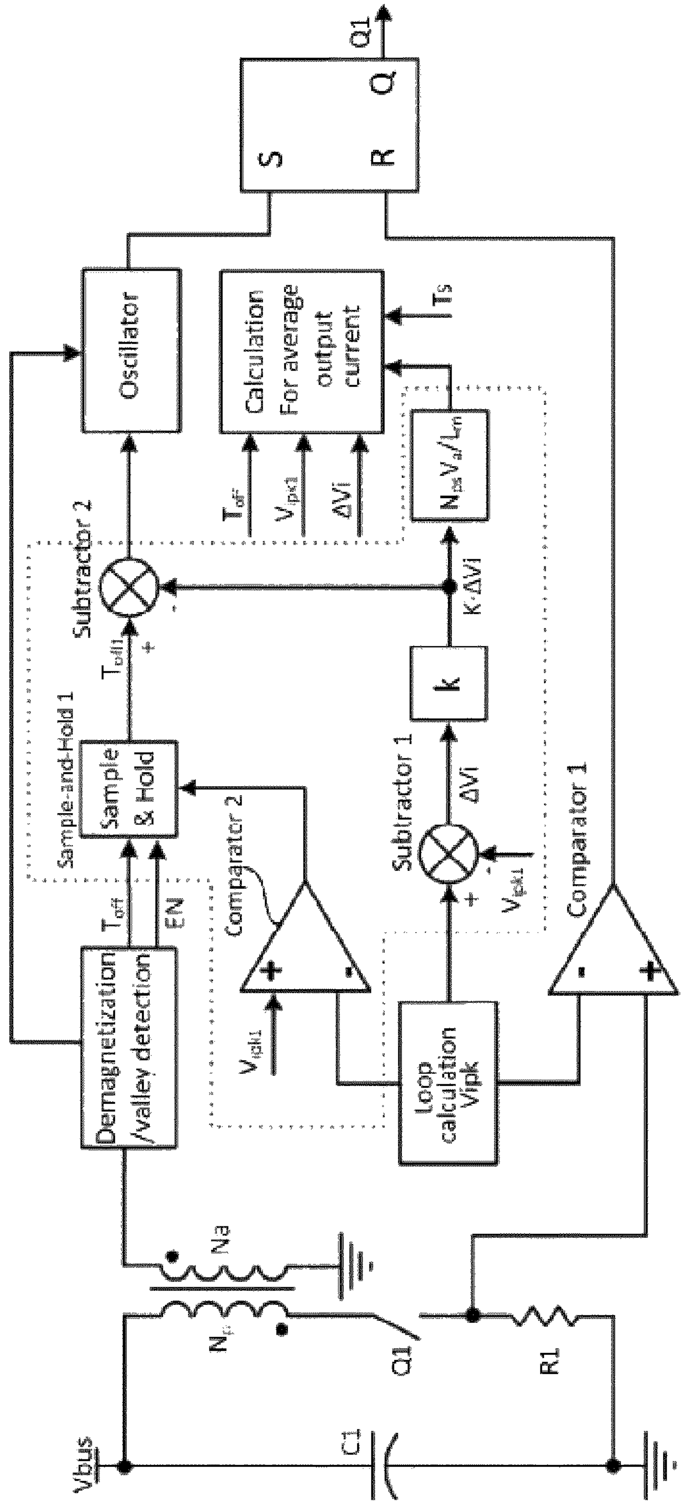
FIG. 3 is an example of control using the method of Embodiment 1 of the present application.

The present embodiment provides a block diagram of controlling a flyback converter in a continuous current mode, as shown in FIGS. 2 and 3. For sampling the transformer current, R1 is used to convert a current signal into a voltage signal. In addition to an existing technique of peak current control, a Sample-and-Hold (S/H) 1, a comparator 2, subtractors 1 and 2, and proportionality coefficients k and $N_{ps}\cdot V_o/L_m$ are added, as shown in the dashed box; For a unit of calculating average output current, output signals of ΔVi and the proportionality coefficient $N_{ps}\cdot V_o/L_m$ are introduced; and a slope compensation unit is omitted, such that it is not necessary to introduce a complete transformer current signal into the unit of calculating average output current. When a demagnetization/valley detection unit detects that it is in a critical current mode, the Sample-and-Hold (S/H) 1 is enabled, so that when comparator 2 flips, $T_{off}$ is latched as $T_{off1}$, thereby realizing a first period. When in a discontinuous current mode (DCM), the Sample-and-Hold (S/H) 1 does not work, and the ΔVi is output by the subtractor 1 as 0, thereby realizing a second period; When it is necessary to enter a continuous current mode (CCM), ΔVi is greater than 0, and an oscillator turns on Q1 based on the time $T_{off1}-k\cdot\Delta Vi$ output from the subtractor 2, thereby realizing a third period. Based on thus structure, the flow steps of FIG. 2 can be realized, and the unit of calculating average output current does not need to distinguish between DCM and CCM.

Figure 1:
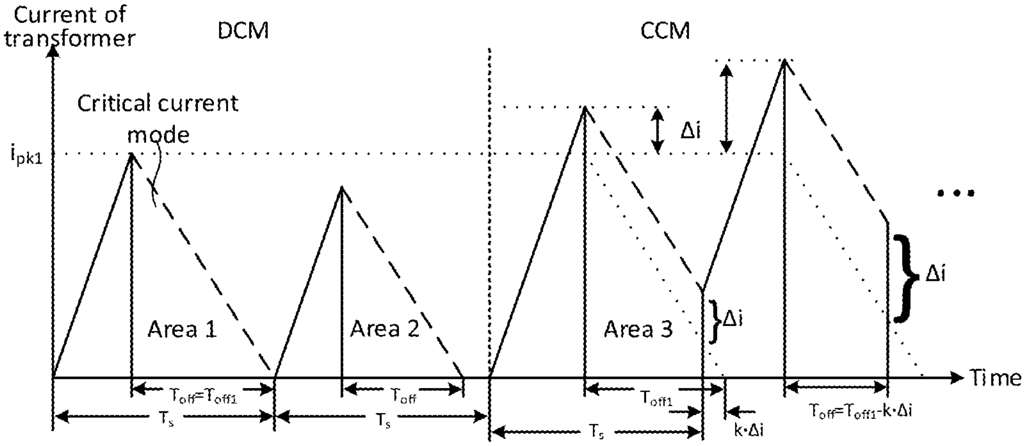
FIG. 1 shows transformer current waveforms of a flyback converter under DCM as well as those under CCM, according to an implementation method of the present application.

A calculation method for average output current can be derived for an area 3 in FIG. 1. Since a descending slope of the current of the transformer is only affected by an output voltage and hardly changes, the calculation of the area 3 can be simplified by constructing a parallelogram. One part of the upper base of the trapezoid of the area 3 is Δi, and the other part is proportional to the reduction of turn-off time k·Δi, wherein the proportional relationship is the descending slope $N_{ps}\cdot V_o/L_m$ of the current of the transformer; and the lower base of the trapezoid is $i_{pk}$ of the current period, and the height is the reduced $T_{off}$, from which the average output current for the period can be calculated.

In a specific embodiment, the proportionality coefficient k is set to be 0, which means that the turn-off time will remain constant at $T_{off1}$ for the third period at any $i_{pk}>i_{pk1}$, the flyback converter can still enter the CCM, but the ascending speed of the duty cycle is lower. A control structure of the embodiment can be further simplified, the subtractor 2 and two proportionality coefficients can be omitted, and the unit of calculating average output current can be simpler.

Figure 4:
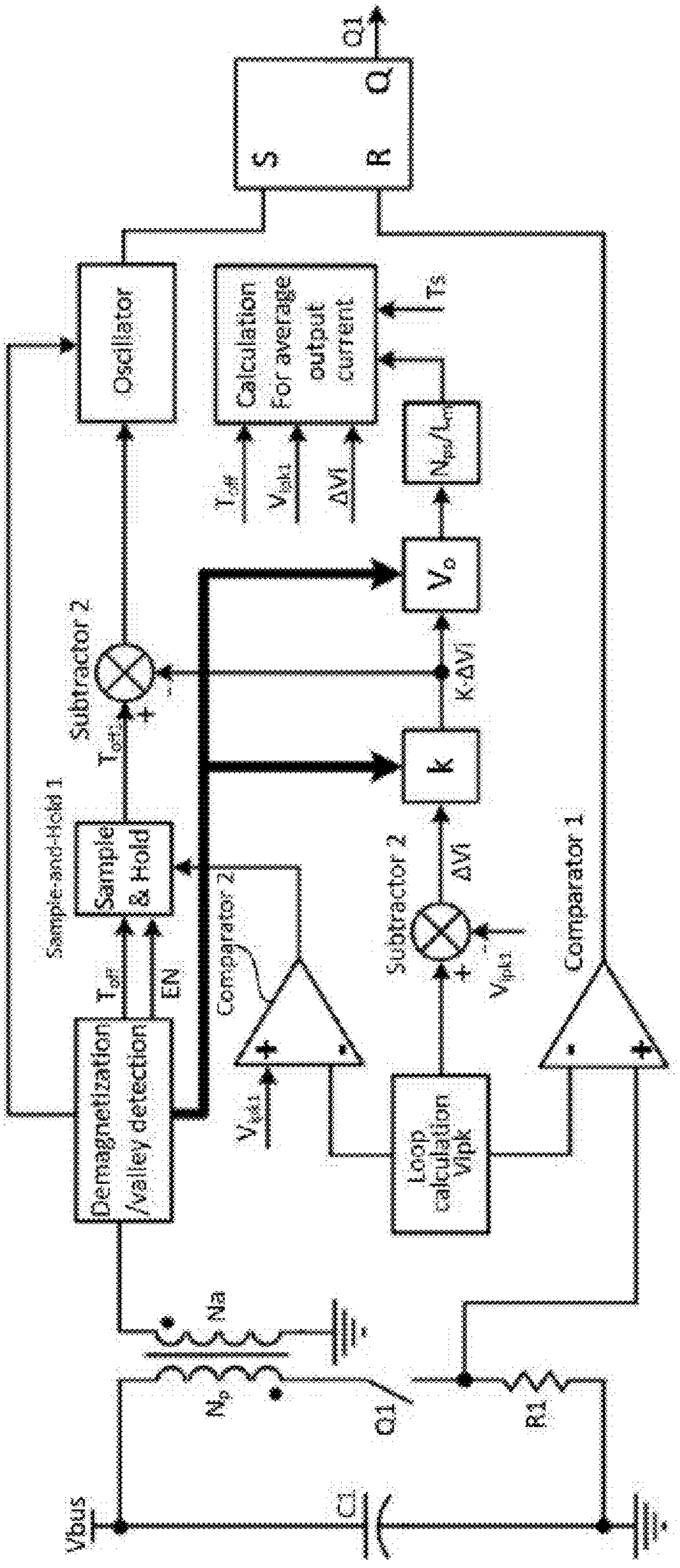
FIG. 4 is an example of control using the method of Embodiment 2 of the present application.
Figure 5:
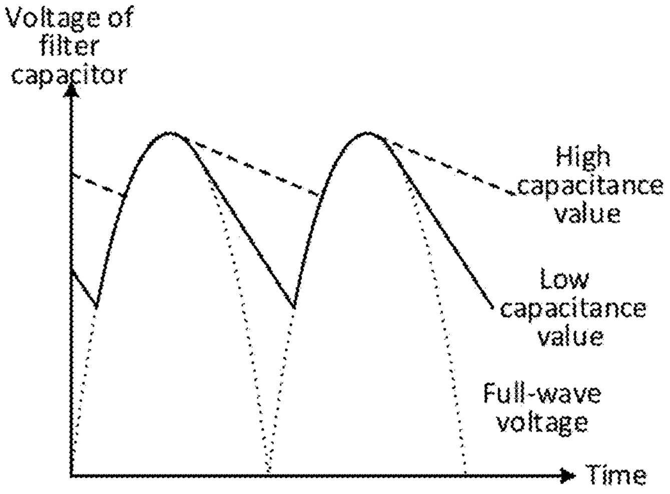
FIG. 5 shows fluctuation curves of filter voltage under different filter capacitances.
Figure 6:
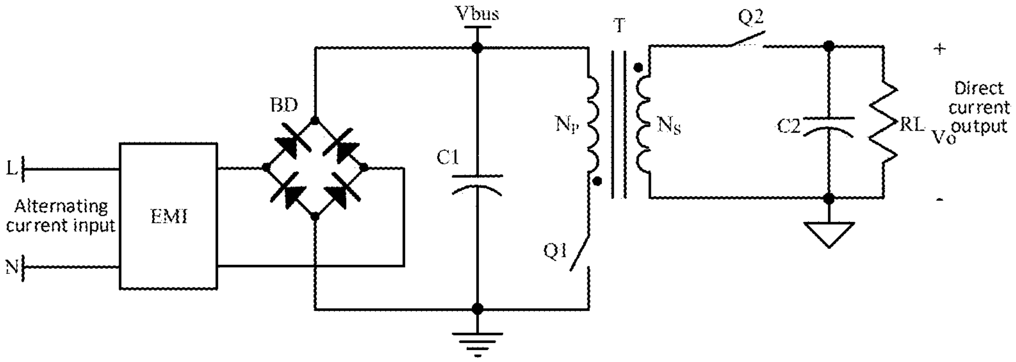
FIG. 6 is a typical AC/DC flyback converter circuit.
Figure 7:
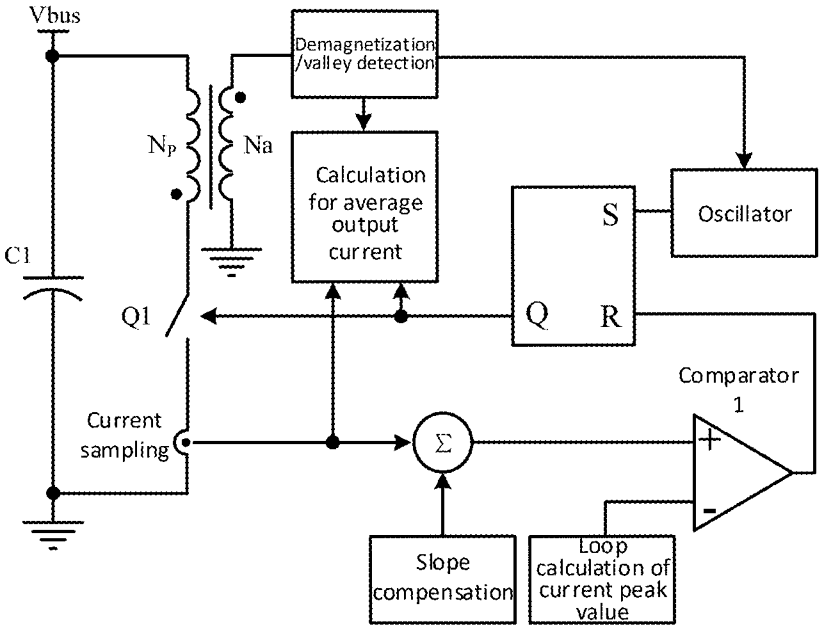
FIG. 7 is an example of peak current control of a flyback converter.
Figure 8:
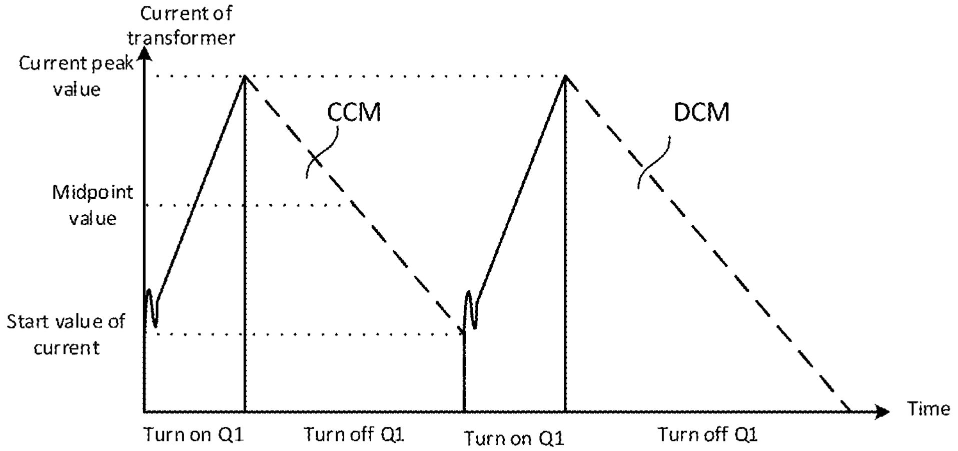
FIG. 8 shows transformer current waveforms of a flyback converter under CCM as well as those under DCM.

Another embodiment provides a block diagram of controlling a flyback converter in a continuous current mode, as shown in FIG. 4. The proportionality coefficient k can be changed according to the operating condition; the proportionality coefficient $N_{ps}\cdot V_o/L_m$ is then split into two coefficients: a real physical fixed value $N_{ps}/L_m$ and a variable value $V_o$. Both k and $V_o$ can be controlled by the demagnetization/valley detection unit. The demagnetization/valley detection unit can indirectly detect input and output voltage information of the flyback converter through an auxiliary winding $N_a$, so that it can reasonably change the coefficients of k and $V_o$, more precisely control the duty cycle of entering into the CCM, and be adapted to different application scenarios.

The present invention does not limit how to achieve the addition, subtraction, multiplication, or division in the calculation method for the average output current, or any use of calculation results, such as use for loop control, power calculation, or triggering protection.

One of the core points of the present invention: when the filter capacitor C1 adopts a different capacitance, the depth and speed of the flyback entering CCM can be stably controlled and regulated by changing the proportionality coefficient k, when Vbus is changing drastically. If a larger value of k is used, the switching frequency rises rapidly with increase of the peak current, which is not limited by a preset frequency of the oscillator, and the largest duty cycle of the CCM can exceed 85%.

Another one of the core points of the present invention: due to the control of the turn-off time, there is no subharmonic oscillation between a large turn-off time and a small turn-off time, when flyback converter enters the CCM. Besides, there is no need for a slope compensation unit, and there is no loss of the maximum peak current. The utilization rate of the transformer is increased, and the adaptability of the flyback is enhanced.

Another one of the core points of the present invention: when the average output current is calculated, there is no need to distinguish between DCM operating condition and CCM operating condition, besides, the complete transformer current signal is not needed, only the peak current information is needed, thus the influence by noise of turning on Q1 and the influence by sampling delay can be avoided, and the calculation accuracy can be improved.

It is to be understood that the above implementations are merely exemplary implementations for the purpose of illustrating the principles of the present invention, however, the present invention is not limited thereto. For a person of ordinary skill in the art, various variations and improvements may be made without departing from the spirit and essence of the present invention, which are also considered to be within the scope of protection of the present invention.

The invention claimed is:

1. A control method for a flyback converter in a continuous current mode (CCM), comprising:

step 1: recording, based on a peak current control technique, a reference current peak value of a transformer as $i_{pk1}$ and corresponding turn-off time $T_{off1}$, which is recorded as a first period, when the flyback converter is operated in a critical current mode, wherein the critical current mode is not limited to turning on a switch immediately after the current of the transformer returns to zero, and includes turning on the switch at a first valley of resonance, with a time difference, wherein the time difference between (i) a first time point at which the current of the transformer returns to zero and (ii) a second time point corresponding to the first valley of resonance is half of a system resonance period;

step 2: if a current peak value $i_{pk}$ of a certain period is not higher than $i_{pk1}$, the switch is turned on after its original turn-off logic ends, which is recorded as a second period;

step 3: controlling, if a current peak value $i_{pk}$ of a certain period is higher than $i_{pk1}$ with a peak value difference Δi, the switch to reduce the turn-off time of the period to be $T_{off1}-k\cdot\Delta i$, thereby preventing a current from returning to zero at the end of the period, such that the switch enters the CCM, which is recorded as a third period, wherein k is a preset proportionality coefficient; and step 4, switching the flyback converter between discontinuous current mode (DCM) and CCM based on the current peak value $i_{pk}$.

2. The control method according to claim 1, wherein in step 1, an operating mode of a certain period is able to be changed, by setting the reference current peak value of the period as $i_{pk1}$ and turning on the switch in critical current mode, thereby obtaining the turn-off time $T_{off1}$.

3. The control method according to claim 1, wherein in step 3, when a minimum input voltage of the flyback converter decreases, a CCM duty cycle and a k value are configured to increase, thereby reducing the turn-off time of the third period.

4. The control method according to claim 1, wherein a calculation method for an average output current is as follows:

$$I_o = \frac{1}{2}\left[i_{pk} + \Delta i \times \left(1 + \frac{N_{ps} \times V_o}{L_m} \times k\right)\right] \times N_{ps} \times \frac{T_{off}}{T_s},$$

wherein $i_{pk}$ is a current peak value of each period, $\Delta i$ is $i_{pk}-i_{pk1}$, $N_{ps}$ is a transformer primary-to-secondary turn ratio, $V_o$ is a flyback output voltage value, $L_m$ is a transformer excitation inductance, $T_{off}$ is turn-off time or transformer current demagnetization time, and $T_s$ is period time.

5. The control method according to claim 4, wherein in the first period and the second period, the current peak value $i_{pk}$ is less than $i_{pk1}$, and $\Delta i$ is configured to be substituted as a zero value in the calculation method for the average output current, which is simplified as:

$$I_o = \frac{1}{2} i_{pk} \times N_{ps} \times \frac{T_{off}}{T_s}.$$

6. The control method according to claim 4, wherein when the average output current is calculated, in the first period and the second period, $T_{off}$ is transformer current demagnetization time, and wherein in the third period, since the current of the transformer is prevented from returning to zero at the end of the period, $T_{off}$ is $T_{off1}-k\cdot\Delta i$.

* * * * *